US006944244B2

(12) United States Patent
Belotserkovsky et al.

(10) Patent No.: US 6,944,244 B2
(45) Date of Patent: Sep. 13, 2005

(54) MECHANISM FOR OFDM EQUALIZER TAP INITIALIZATION USING AN ADAPTIVE ALGORITHM

(75) Inventors: Maxim B. Belotserkovsky, Indianapolis, IN (US); Louis Robert Litwin, Jr., Plainsboro, NJ (US)

(73) Assignee: Thomson Licensing S.A., Billancourt (FR)

( * ) Notice: Subject to any disclaimer, the term of this patent is extended or adjusted under 35 U.S.C. 154(b) by 760 days.

(21) Appl. No.: 09/955,392

(22) Filed: Sep. 18, 2001

(65) Prior Publication Data

US 2003/0053571 A1 Mar. 20, 2003

(51) Int. Cl.$^7$ .................................................. H04B 1/10
(52) U.S. Cl. ...................... 375/350; 375/316; 375/346; 375/350; 708/300; 455/307
(58) Field of Search ................. 375/350, 233, 375/210, 219

(56) References Cited

U.S. PATENT DOCUMENTS

| | | | |
|---|---|---|---|
| 4,635,276 A | 1/1987 | Karabinis | 375/15 |
| 5,159,565 A | 10/1992 | Bune | 364/724.16 |
| 5,222,101 A | 6/1993 | Ariyavisitakul et al. | 375/13 |
| 5,297,165 A | 3/1994 | Ueda et al. | 375/12 |
| 5,351,134 A | 9/1994 | Yaguchi et al. | 358/435 |
| 5,414,732 A | 5/1995 | Kaufmann | 375/232 |
| 5,475,710 A | 12/1995 | Ishizu et al. | 375/232 |
| 5,602,602 A | 2/1997 | Hulyalkar | 348/607 |
| 5,787,118 A | 7/1998 | Ueda | 375/232 |
| 5,841,484 A | 11/1998 | Hulyalkar et al. | 348/607 |
| 5,956,624 A | 9/1999 | Hunsinger et al. | 455/65 |
| 6,014,407 A | 1/2000 | Hunsinger et al. | 375/206 |
| 6,034,564 A | 3/2000 | Iwamatsu | 329/306 |
| 6,144,708 A | 11/2000 | Maruyama | 375/327 |

(Continued)

OTHER PUBLICATIONS

B.P. Lathi, "Modern Digital and Analog Communication Systems," pp 163, 168, 206, 1983.
J.A. Bingham, "Multicarrier Modulation for Data Transmission: An Idea Whose Time Has Come," *IEEE Communications Magazine*, vol. 28. No. 5, pp. 5–14, May 1990.
J.M. Ciotti, "A Multicarrier Primer," in ANSI T1E1.4 Committee Contribution, No. 91–157, Boca Raton, FL, Nov. 1991.
Simon Haykin, "Adaptive Equalization," Communication Systems, 3$^{rd}$ Edition, John Wiley & Sons, pp. 452–458, New York, 1994.
"Broadband Radio Access Networks (BRAN); HIPERLAN Type 2 Functional Specification, Part 1—Physical (PHY) layer," European Telecommunications Standards Institute, vol. J, Sep. 1999.

(Continued)

*Primary Examiner*—Stephen Chin
*Assistant Examiner*—Erin M. File
(74) *Attorney, Agent, or Firm*—Joseph S. Tripoli; Ronald H. Kurdyla; Vincent E. Duffy (57) ABSTRACT

A method for initializing an equalizer in an Orthogonal Frequency Division Multiplexing ("OFDM") receiver includes generating a desired equalizer tap setting based on an adaptive algorithm. An initial setting for the adaptive algorithm corresponds to an approximate inverse of a channel estimate, and the desired tap setting corresponds to an ideal inverse of the channel estimate. In an alternative embodiment, a method includes generating a channel estimate, generating an equalizer tap setting based on a complex conjugate of the estimate and a quantized magnitude squared of the estimate, and repeatedly generating subsequent tap settings until an error falls within limits. In another alternative embodiment, an apparatus includes a tap initialization controller configured to: generate a channel estimate, generate an equalizer tap setting based on a complex conjugate of the estimate and a quantized magnitude squared of the estimate, and repeatedly generate subsequent tap settings until an error falls within limits.

16 Claims, 5 Drawing Sheets

U.S. PATENT DOCUMENTS

| | | | | |
|---|---|---|---|---|
| 6,167,082 | A | 12/2000 | Ling et al. | 375/233 |
| 6,175,591 | B1 | 1/2001 | Iwamatsu | 375/232 |
| 6,181,714 | B1 | 1/2001 | Isaksson et al. | 370/491 |
| 6,188,722 | B1 | 2/2001 | Velez et al. | |
| 2003/0007554 | A1 * | 1/2003 | Birru | 375/233 |

OTHER PUBLICATIONS

DRAFT Supplement to STANDARD [for]Information Technology—Telecommunications and information exchange between systems—Local and metropolitan area networks—Specific Requirements—Part 11: Wireless LAN Medium Access Control (MAC) and Physical Layer (PHY) specifications: High Speed Physical Layer in the 5 GHz Band, IEEE P82.11a/D7.0, (Supplement to IEEE Std 802.11–1999).

http://www.seas,ucla.edu/~langit/slicer.m,pp.1, Jul. 19, 2001.

Gregory T. Uehara, Caesar S.H. Wong, Jacques C. Rudell, and Paul R. Gray, A 50MHz 70mW 8–Tap Adaptive Equalizer/Viterbi, Sequence Detector in 1.2$\mu$m CMOS, Electronics Research Laboratory, Department of Electrical Engineering & Computer Sciences, University of California, http://kabuki.eecs.berkeley.edu/%7Ejrudell/papers/CICC/ pp. 1–11, Berkele CA, Jul. 19, 2001.

Caesar S.H. Wong, Jacques C. Rudell, Gregory T. Uehara, and Paul R. Gray, A 50MHz 70mW 8–Tap Adaptive Equalizer for Partial Response Channels, Department of Electrical Engineering and Computer Sciences, University of California, http://kabuki.eecs.berkely.edu%7Ejrudell/papers/jssc/, pp. 1–19, Berkeley, CA, Jul. 19, 2001.

* cited by examiner

MECHANISM FOR OFDM EQUALIZER TAP INITIALIZATION USING AN ADAPTIVE ALGORITHM

FIELD OF THE INVENTION

The present invention relates to processing orthogonal frequency division multiplexed ("OFDM") signals.

BACKGROUND OF THE INVENTION

A local area network ("LAN") may be wired or wireless. A wireless local area network ("wireless LAN" or "WLAN") is a flexible data communications system implemented as an extension to, or as an alternative for, a wired local area network ("wired LAN") within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health-care, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing ("OFDM"), has proven to be exceptionally useful for WLAN communications.

OFDM is a robust technique for efficiently transmitting data over a channel. The technique uses a plurality of subcarrier frequencies ("subcarriers") within a channel bandwidth to transmit data. These subcarriers are arranged for optimal bandwidth efficiency as compared to conventional frequency division multiplexing ("FDM"), which can waste portions of the channel bandwidth in order to separate and isolate the subcarrier frequency spectra and thereby avoid inter-carrier interference ("ICI"). By contrast, although the frequency spectra of OFDM subcarriers overlap significantly within the OFDM channel bandwidth, OFDM nonetheless allows resolution and recovery of the information that has been modulated onto each subcarrier. In addition to the more efficient spectrum usage, OFDM provides several other advantages, including a tolerance to multi-path delay spread and frequency selective fading, good interference properties, and relatively simplified frequency-domain processing of the received signals.

For processing, an OFDM receiver typically converts a received signal from the time-domain into frequency-domain representations of the signal. Generally, conventional OFDM receivers accomplish this by sampling the timedomain signal and then applying Fast Fourier Transforms ("FFTs") to blocks of the samples. The resulting frequency-domain data generally includes a complex value (e.g., magnitude component and phase component, or real component and imaginary component) for each respective subcarrier. The receiver typically applies an equalizer to the frequency-domain data before recovering the baseband data that was modulated onto each subcarrier. Primarily, the equalizer corrects for multi-path distortion effects of the channel through which the OFDM signal was transmitted. Some receivers may also use the equalizer to correct for other problems encountered with OFDM communications, such as, for example, carrier frequency offset (i.e., a difference between the transmitter and receiver frequencies), and/or sampling frequency offset (i.e., a difference between the transmitter and receiver sampling clock frequencies). Carrier frequency offset and sampling frequency offset can result in a loss of orthogonality between the subcarriers, which results in inter-carrier interference ("ICI") and a severe increase in the bit error rate ("BER") of the data recovered by the receiver. In any event, the equalizer of the OFDM receiver typically has one or more taps which receive a tap setting corresponding to the complex correction (e.g., real correction and imaginary correction, or magnitude correction and phase correction) for each subcarrier.

Historically, the equalizer taps have been initialized with (X/Y), which represents a division of a predetermined, stored frequency-domain representation of an expected OFDM signal (i.e., a "training symbol" or "X") by the frequency-domain representation of the corresponding actual received signal ("Y"). Such initialization schemes are based on a simplified frequency-domain channel model that assumes orthogonality among the subcarriers, in which Y=C*X, where an actual received signal (Y) is merely a transmitted predetermined signal (X) times the channel response (C). In such a case, C=Y/X and thus, to compensate for the channel response, the equalizer is initialized with the inverse of the channel response (i.e., 1/C, or X/Y).

However, in digital data processing systems division operations are generally slower and require more memory than multiplication operations. Accordingly, some OFDM receivers implement the necessary division by divider circuits in hardware. But hardware divider circuits are undesirably expensive. Alternatively, other receivers approximate the division by resort to a lookup table. There, multiplication operations can be employed when the received training symbol (Y) is the input to the table and the output of the table is the inverse of the received training symbol (1/Y). The inverse (1/Y) is then multiplied by the actual training symbol (X) to form the tap initialization (X/Y), thus avoiding division operations. However, in order to get good results, the lookup tables must have undesirably large numbers of storage locations, which is also undesirably expensive. The present invention is directed to the correction of this problem.

SUMMARY OF THE INVENTION

A method for initializing an equalizer in an Orthogonal Frequency Division Multiplexing ("OFDM") receiver includes generating a desired equalizer tap setting based on an adaptive algorithm. An initial setting for the adaptive algorithm corresponds to an approximate inverse of a channel estimate, and the desired tap setting corresponds to an ideal inverse of the channel estimate. In an alternative embodiment, a method includes generating a channel estimate, generating an equalizer tap setting based on a complex conjugate of the estimate and a quantized magnitude squared of the estimate, and repeatedly generating subsequent tap settings until an error falls within limits. In another alternative embodiment, an apparatus includes a tap initialization controller configured to: generate a channel estimate, generate an equalizer tap setting based on a complex conjugate of the estimate and a quantized magnitude squared of the estimate, and repeatedly generate subsequent tap settings until an error falls within limits.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which.

DETAILED DESCRIPTION OF THE PREFERRED EMBODIMENT

The characteristics and advantages of the present invention will become more apparent from the following description, given by way of example.

It should be appreciated that "1", "one", and/or "unity" as used in the description of the present invention and the claims means any suitable number or amount taken as that for which 1 is meant to stand in a formula, calculation, computation, or otherwise, and in practice the actual number or amount may not be exactly 1 due to accuracy limitations or other features of the hardware and/or software in which the invention is embodied. Similarly, it should be appreciated that "0" and/or "zero" as used in the description of the present invention and the claims means any suitable number or amount taken as that for which 0 is meant to stand in a formula, calculation, computation, or otherwise, and in practice the actual number or amount may not be exactly 0 due to accuracy limitations or other features of the hardware and/or software in which the invention is embodied.

Figure 1:
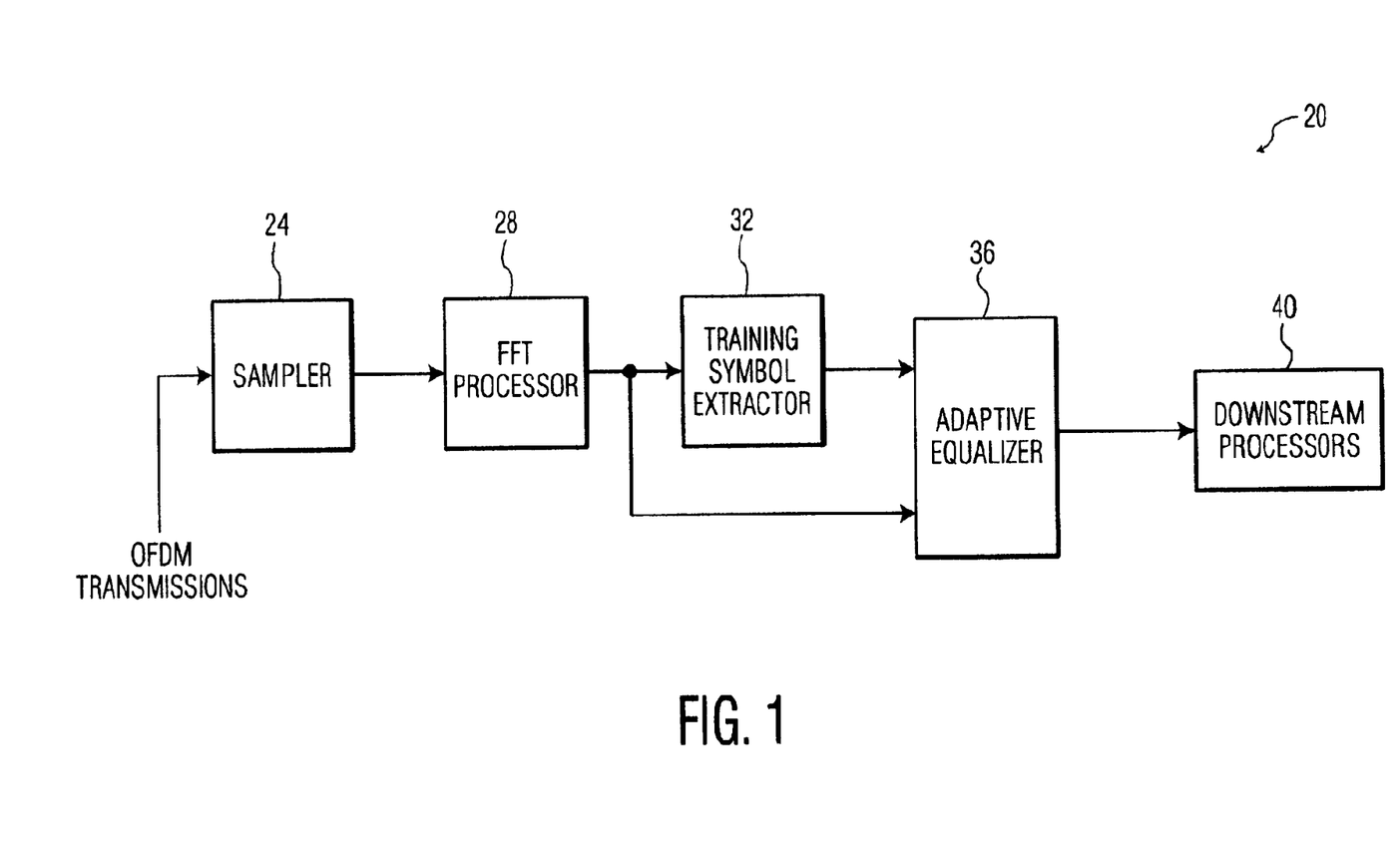
FIG. 1 is a block diagram of an OFDM receiver according to the present invention.

Referring to FIG. 1, a block diagram of an OFDM receiver 20 according to the present invention is shown. OFDM receiver 20 includes a sampler 24, an FFT processor 28, a training symbol extractor 32, an adaptive equalizer 36, and downstream processors 40. In general, OFDM receiver 20 is configured to receive OFDM transmissions and recover baseband data therefrom. The received transmissions may conform to the proposed ETSI-BRAN HIPERLAN/2 (Europe) and/or the IEEE 802.11a (USA) wireless LAN standards, which are herein incorporated by reference, or they may conform to any other suitable protocols or standard formats. It should be noted that OFDM receiver 20 may be embodied in hardware, software, or any suitable combination thereof. Additionally, OFDM receiver 20 may be integrated into other hardware and/or software. For example, OFDM receiver 20 may be part of a WLAN adapter that is implemented as a PC card for a notebook or palmtop computer, as a card in a desktop computer, or integrated within a hand-held computer. Further, it should be readily appreciated that various components of OFDM receiver 20 may suitably be interconnected by various control inputs and outputs (not shown) for the communication of various control settings. For example, FFT processor 28 may include a suitable input for receiving window synchronization settings.

Sampler 24 is configured to receive transmitted OFDM signals and generate time-domain samples or data therefrom. To this end, sampler 24 includes suitable input signal conditioning and an analog-to-digital converter ("ADC").

FFT processor 28 is coupled to sampler 24 to receive time-domain data therefrom. FFT processor 28 is configured to generate frequency-domain representations or data from the time-domain data by performing FFT operations on blocks of the time-domain data.

Training symbol extractor 32 is coupled to FFT processor 28 to receive frequency-domain data therefrom. Training symbol extractor 32 is configured to extract training symbols from training sequences that have been included in the transmitted OFDM signals. A training sequence contains predetermined transmission values for all of the subcarriers of the OFDM carrier. Here, it should be noted that for clarity of exposition, much of the description of the present invention is presented from the point of view of a single subcarrier. In this context, a "training symbol" may be viewed as the predetermined frequency-domain value for a particular subcarrier. Nevertheless, it should be readily appreciated that the present invention may be used to sequentially process data for a plurality of subcarriers, and/or various components of the present invention may be suitably replicated and coupled to parallel process data for a plurality of subcarriers.

Adaptive equalizer 36 is coupled to training symbol extractor 32 to receive training symbols therefrom and is coupled to FFT processor 28 to receive frequency-domain data therefrom. In general, adaptive equalizer 36 is configured to reduce the multi-path distortion effects of the channel through which the OFDM signals have been transmitted. The configuration and operation of adaptive equalizer 36 is discussed in further detail below.

Downstream processors 40 are coupled to adaptive equalizer 36 to receive equalized frequency-domain data therefrom. Downstream processors 40 are configured to recover baseband data that was included in the transmitted OFDM signals.

In operation of the OFDM receiver 20, sampler 24 receives OFDM signals and generates time-domain data therefrom. FFT processor 28 generates frequency-domain data from the time-domain data by performing FFT operations on blocks of the time-domain data, and training symbol extractor 32 extracts training symbols from training sequences that have been included in the OFDM signals. Generally, adaptive equalizer 36 reduces multi-path distortion effects of the OFDM transmission channel. The operation of adaptive equalizer 36 is discussed in further detail below. Downstream processors 40 recover baseband data that was included in the transmitted OFDM signals.

Figure 2:
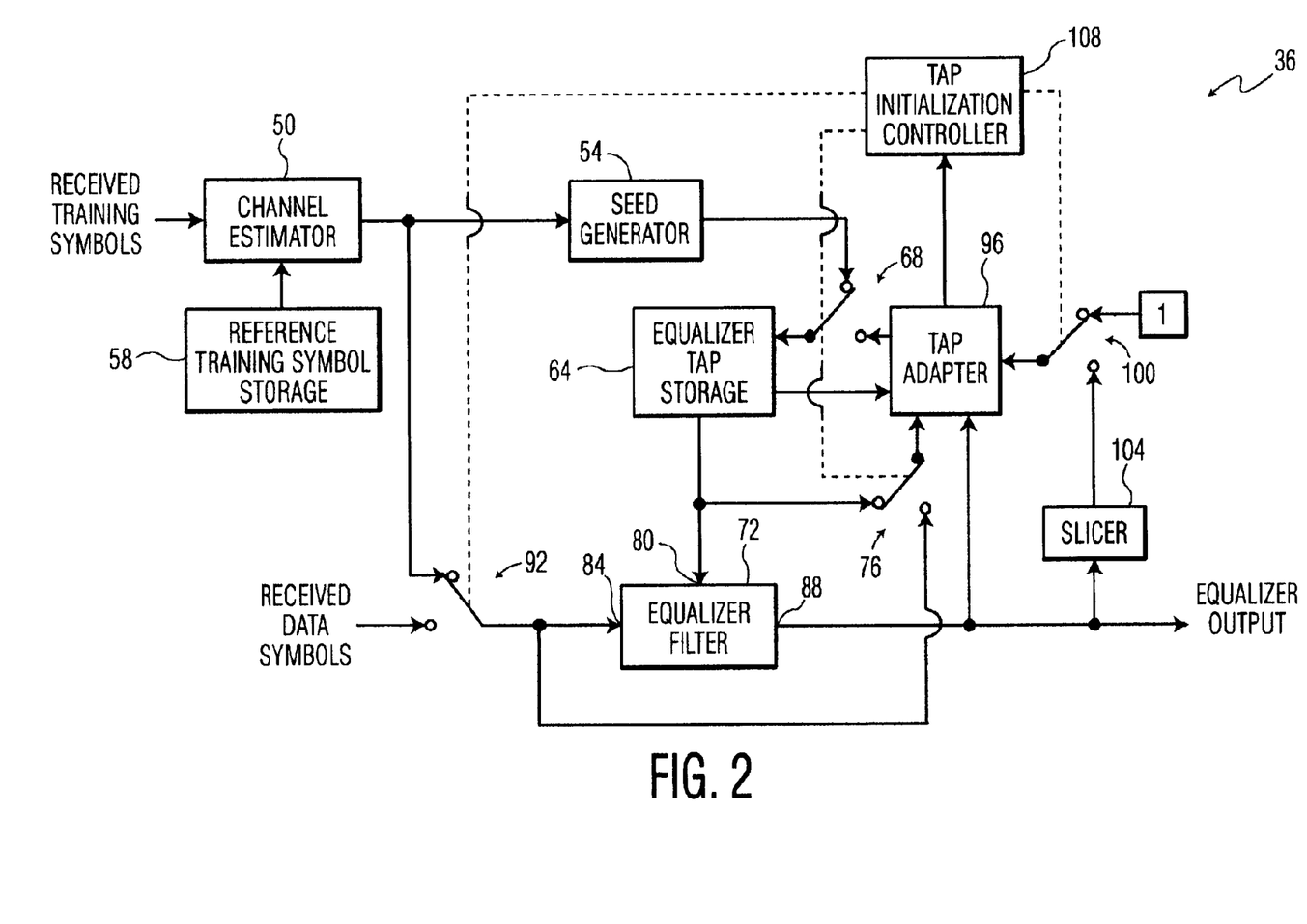
FIG. 2 is a block diagram of the adaptive equalizer of FIG. 1.

Referring now to FIG. 2, a block diagram of adaptive equalizer 36 of FIG. 1 is shown. Adaptive equalizer 36 includes channel estimator 50, seed generator 54, reference training symbol storage 58, equalizer tap storage 64, switch 68, equalizer filter 72, switch 76, switch 92, tap adapter 96, switch 100, slicer 104, and tap initialization controller 108. As noted above, OFDM receiver 20 (FIG. 1) may be embodied in hardware, software, or any suitable combination thereof. Accordingly, it should be readily appreciated that adaptive equalizer 36 may be embodied in hardware, software, or any suitable combination thereof. In general, adaptive equalizer 36 is configured to generate an initial equalizer tap setting based on a training symbol and an adaptive algorithm, and to generate subsequent tap settings based on data symbols and an adaptive algorithm.

Channel estimator 50 is coupled to training symbol extractor 32 (FIG. 1) to receive training symbols therefrom. Further, channel estimator 50 is coupled to reference training symbol storage 58 to receive a predetermined reference training symbol therefrom. Channel estimator 50 is configured to generate a channel estimate based on a training symbol and the reference training symbol. Further details regarding the operation of channel estimator 50 are discussed below.

Seed generator 54 is coupled to channel estimator 50 to receive the channel estimate therefrom. Seed generator 54 is configured to generate a tap seed based on the channel estimate as discussed further below.

Reference training symbol storage 58 is coupled to channel estimator 50 to provide the reference training symbol thereto. Reference training symbol storage 58 is configured to store the reference training symbol (real part and imaginary part, or magnitude and phase).

Equalizer tap storage 64 is coupled to switch 68 to selectively receive either the tap seed from seed generator 54 or a new tap setting from tap adapter 96. Further, equalizer tap storage 64 is coupled to tap adapter 96 to provide an old tap setting thereto. Also, equalizer tap storage 64 is coupled to equalizer filter 72 to provide the new tap setting thereto. Additionally, equalizer tap storage 64 is coupled to switch 76 to selectively provide the new tap setting to tap adapter 96. Equalizer tap storage 64 is configured to store a tap setting (real part and imaginary part, or magnitude and phase).

Equalizer filter 72 includes a first input port 80, a second input port 84, and an output port 88. Input port 80 is coupled to equalizer tap storage 64 to receive the new tap setting therefrom. Input port 84 is coupled to switch 92 to selectively receive either the channel estimate from the channel estimator 50 or a data symbol from FFT processor 28 (FIG. 1). Equalizer filter 72 is configured to generate an equalizer output at output port 88 that represents a frequency-domain multiplication of the data received through its two input ports.

Tap adapter 96 is coupled to output port 88 of equalizer filter 72 to receive the equalizer output therefrom. Further, tap adapter 96 is coupled to switch 76, which is coupled to input port 80 of equalizer filter 72 and input port 84 of equalizer filter 72 such that tap adapter 96 also selectively receives either the data provided to input port 80 or the data provided to input port 84. Also, tap adapter 96 is coupled to switch 68 to selectively provide the new tap setting to equalizer tap storage 64. Additionally, as noted above, tap adapter 96 is coupled to equalizer tap storage 64 to receive an old tap setting therefrom. Further, tap adapter 96 is coupled to tap initialization controller 108 to provide an "update completed" signal thereto. The update completed signal is discussed in further detail below. Meanwhile, tap adapter 96 is also coupled to switch 100 to selectively receive either 1 (real part=1 and imaginary part=0, or magnitude=1 and phase=0) or a slicer output. In general, tap adapter 96 is configured to generate tap settings based on an adaptive algorithm. Operation of the tap adapter 96 is discussed in further detail below.

Slicer 104 is coupled to output port 88 of equalizer filter 72 to receive the equalizer output therefrom. Further, slicer 104 is coupled to switch 100 to provide the slicer output thereto. Slicer 104 is configured to generate the slicer output based on a decision as to which of a plurality of predetermined possible data values is closest to the actual equalizer output.

Tap initialization controller 108 is coupled to tap adapter 96 to receive the update completed signal therefrom (the update completed signal is discussed in further detail below). Further, tap initialization controller 108 is coupled to switch 68, switch 76, switch 92, and switch 100 (indicated by the dashed lines) to selectively control the operation of these switches. Tap initialization controller 108 is configured to cause the present invention to switch between various operational modes as is discussed in further detail below (see FIG. 5).

In operation, adaptive equalizer 36 executes the methods and modes discussed below in connection with FIG. 3, FIG. 4, and FIG. 5.

Figure 3:
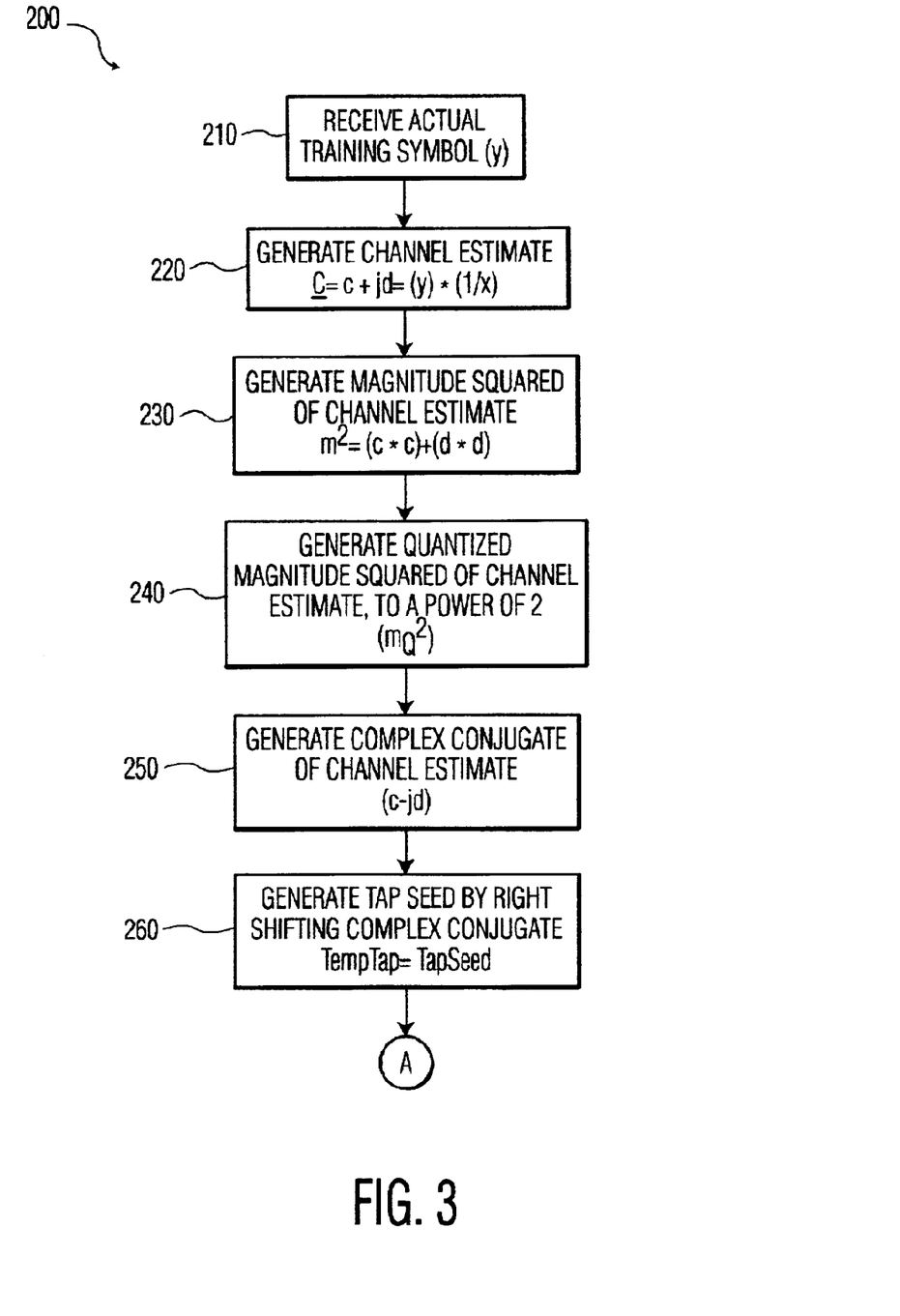
FIG. 3 is a flowchart for a method of generating a tap seed for an adaptive algorithm according to the present invention.

Referring now to FIG. 3, a flowchart for a method 200 of generating a tap seed for an adaptive algorithm according to the present invention is shown. In general, the following description of method 200 assumes execution by adaptive equalizer 36 (FIG. 1 and FIG. 2). Accordingly, it should be readily appreciated that the description of method 200 assumes frequency-domain operations. However, it is noted that method 200 is not necessarily limited to adaptive equalizer 36 and, accordingly, method 200 also may be executed by any suitable alternative hardware, software, or combination thereof.

At step 210, channel estimator 50 receives a training symbol from training symbol extractor 32.

At step 220, channel estimator 50 generates a channel estimate. In general, channel estimator 50 generates the channel estimate by multiplying the received training symbol by a predetermined quantity. The predetermined quantity represents an inverse of a predetermined referenced training symbol. To this end, at step 220 channel estimator 50 may also retrieve the predetermined quantity from reference training symbol storage 58 or, in a case where the received training sequence includes all ones ("1s") and negative ones ("–1s") (for example, OFDM transmissions conforming to HIPERLAN/2) channel estimator 50 may generate the channel estimate by simply inverting the sign of the received training symbol.

At step 230, seed generator 54 generates a magnitude squared of the channel estimate. In general, seed generator 54 generates the magnitude squared of the channel estimate by multiplying the real part of the channel estimate by the real part of the channel estimate and adding the result to the imaginary part of the channel estimate multiplied by the imaginary part of the channel estimate, as follows:

$$m^2 = (c*c) + (d*d)$$

where $m^2$ is the magnitude squared of the channel estimate, c is the real part of the channel estimate, and d is the imaginary part of the channel estimate.

At step 240, seed generator 54 generates a quantized magnitude squared of the channel estimate by quantizing the magnitude squared of the channel estimate to a power of two.

At step 250, seed generator 54 generates a complex conjugate of the channel estimate by inverting the sign of the imaginary part of the channel estimate.

At step 260, seed generator 54 generates a tap seed by right shifting the bits of the complex conjugate of the channel estimate as necessary to produce a practical equivalent of the complex conjugate of the channel estimate divided by the quantized magnitude squared of the channel estimate. For example: when the quantized magnitude squared of the channel estimate is 4 decimal (or 00000100 binary), tap seed generator 54 right shifts the bits of the real and imaginary parts of the complex conjugate of the channel estimate by two places; and when the quantized magnitude squared of the channel estimate is 8 decimal (or 00001000 binary), tap seed generator 54 right shifts the bits of the real and imaginary parts of the complex conjugate of the channel estimate by three places. Here, it should be noted that, since for a complex number, c+jd:

$$1/(c+jd) = (c-jd)/(c^2+d^2) = \{c/[(c*c)+(d*d)]\} - \{jd/[(c*c)+(d*d)]\}$$

the tap seed is an approximate inverse of the channel response. It should be appreciated that the tap seed is only an approximation because magnitude squared of the channel estimate, or [(c*c)+(d*d)], was quantized at step 240 above. However, it should also be appreciated that generating the quantized magnitude squared of the channel estimate to a power of two provides for the right shifting at step 260, which avoids a hardware division circuit or a lookup table. In any event, seed generator 54 provides the tap seed to switch 68 and tap initialization controller 108 controls switch 68 to load the tap seed data into a variable ("TempTap") that is stored in equalizer tap storage 64 (see "generate seed" mode of FIG. 5 and corresponding discussion below).

Figure 4:
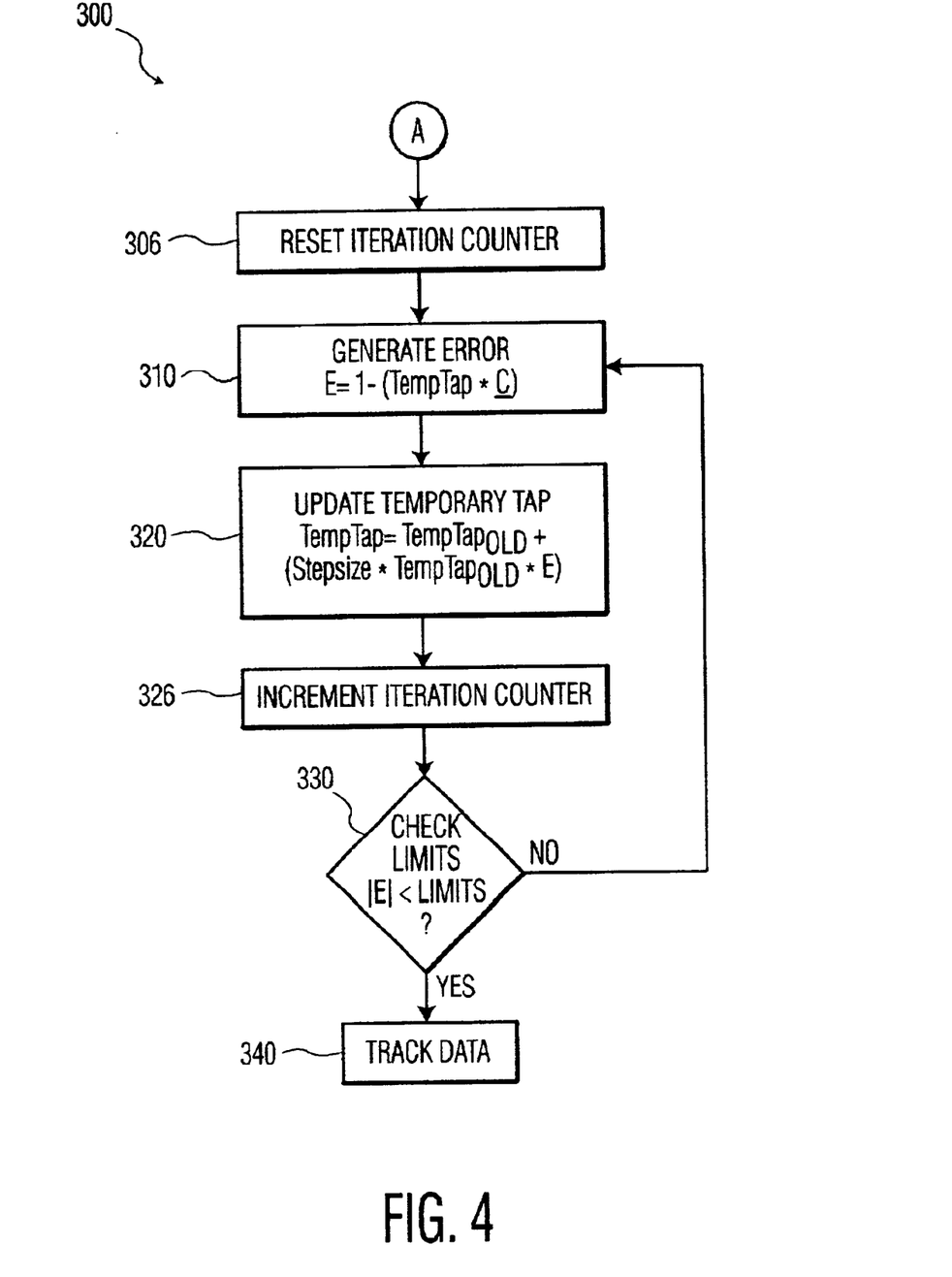
FIG. 4 is a flowchart for a method of operating an adaptive algorithm according to the present invention.

Referring now to FIG. 4, a flowchart for a method 300 of operating an adaptive algorithm according to the present invention is shown. In general, the following description of method 300 assumes execution by adaptive equalizer 36 (FIG. 1 and FIG. 2). Accordingly, it should be readily appreciated that the description of method 300 assumes frequency-domain operations. However, it is noted that method 300 is not necessarily limited to adaptive equalizer 36 and, accordingly, method 300 also may be executed by any suitable alternative hardware, software, or combination thereof.

At step 306, tap adapter 96 sets a variable, ITERATION COUNTER, to zero. Tap adapter 96 uses ITERATION COUNTER to determine when a magnitude of the error generated at step 310 is less than a predetermined limit as discussed further below.

At step 310, tap adapter 96 generates an error according to the following:

$$E=1-(\text{TempTap}*\underline{C})$$

where E is the error, TempTap is the new (or most recent) tap setting stored in equalizer tap storage 64 (and thus provided to input port 80 of equalizer filter 72), and C is the channel estimate generated at step 220 (FIG. 3) above. It should be readily appreciated that tap adapter 96 obtains TempTap data from equalizer tap storage 64 via switch 76 pursuant to the control of tap initialization controller 108 (see "update tap" mode of FIG. 5 and corresponding discussion below). Additionally, it should be readily appreciated that generation of the error in this manner makes sense because, ideally, the equalizer tap setting would be the exact inverse of the channel response, such that the product of the two values would be 1.

At step 320, tap adapter 96 updates TempTap in equalizer tap storage 64 according to the following:

$$\text{TempTap}=\text{TempTap}_{old}+(\text{stepsize}*\text{TempTap}_{old}*E)$$

where $\text{TempTap}_{old}$ is the previously generated TempTap data, and stepsize is the least-mean-squares stepsize value. Suitable ways of determining the stepsize are well known.

At step 326, tap adapter 96 increments ITERATION COUNTER. Thus, ITERATION COUNTER indicates the number of times that tap adapter 96 has updated TempTap during the present execution of method 300.

At step 330, tap adapter 96 determines whether a magnitude of the error generated at step 310 is less than a predetermined limit. Preferably, tap adapter 96 does this by simply determining whether ITERATION COUNTER indicates a predetermined number of iterations, where the predetermined number is that which is required to ensure a desirable minimization of the error. This technique provides a consistent number of iterations for each execution of method 300. The predetermined number of iterations may be based on error convergence calculations, test trials, or a combination thereof. Suitable ways of determining this number are well known. Alternatively, tap adapter 96 may directly compare the magnitude of the error to a predetermined limit, in which case it should be readily appreciated that step 306 (resetting ITERATION COUNTER) and step 326 (incrementing ITERATION COUNTER) may be omitted. In any event, if tap adapter 96 determines that the magnitude of the error is less than the predetermined limit, then at step 340 tap adapter 96 signals tap initialization controller 108 and tap initialization controller 108 causes adaptive equalizer 36 to switch into a "track data" mode (see "track data" mode of FIG. 5 and corresponding discussion below); else, tap adapter 96 repeats step 310, step 320, step 326, and step 330.

It should be appreciated from the foregoing description that the embodiments described herein generally follow a least-mean-squares ("LMS") approach that starts with the tap seed and then recursively generates a more accurate ("desired") initial equalizer tap setting. Further, it should also be appreciated that the desired tap setting is based on an ideal inverse of the channel estimate because as the error approaches zero, TempTap multiplied by the channel estimate approaches 1, and, thus, TempTap ideally becomes the inverse of the channel estimate. However, it is noted that alternative embodiments may employ any other suitable adaptive techniques in combination with or in lieu of LMS.

Figure 5:
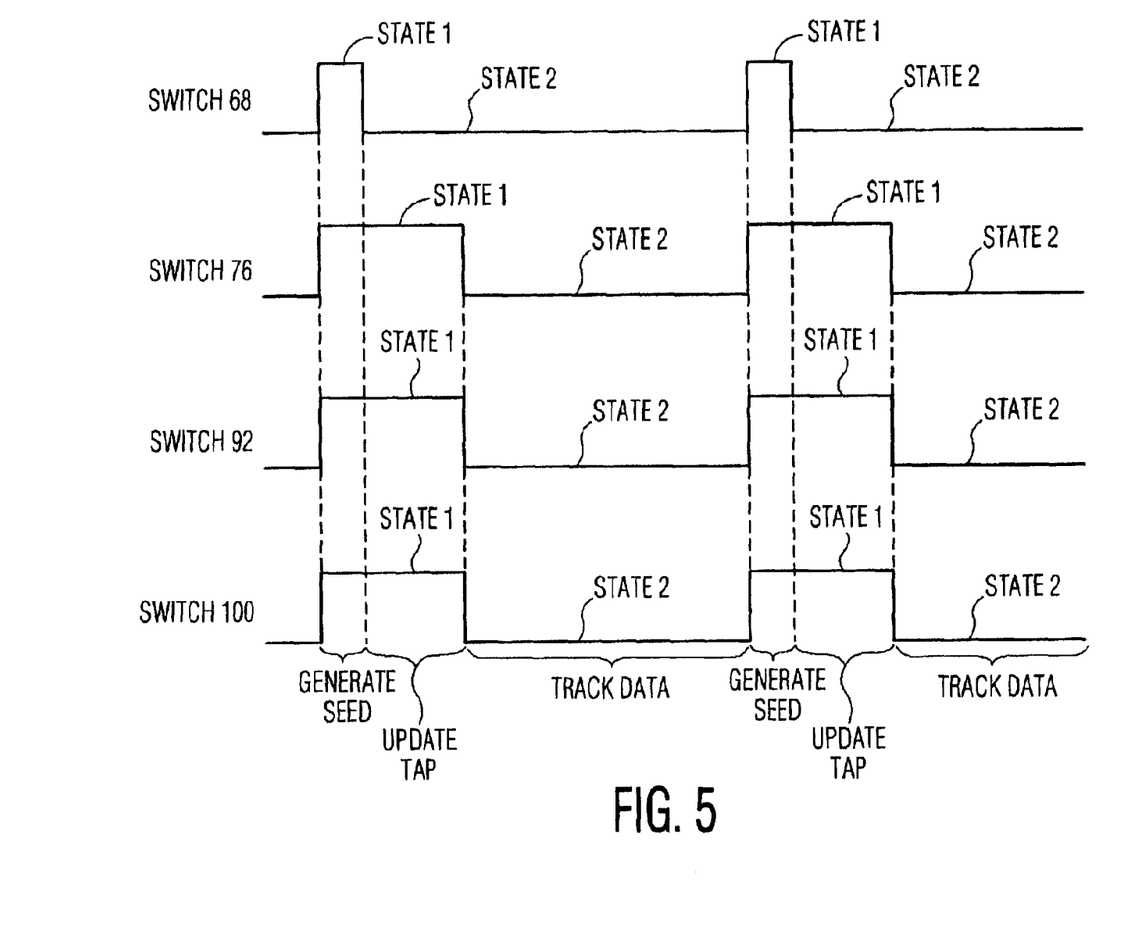
FIG. 5 is an illustration of various operational modes for the adaptive equalizer of FIG. 2.

Referring now to FIG. 5, an illustration of various operational modes for adaptive equalizer 36 of FIG. 2 is shown. In a "generate seed" mode, tap initialization controller 108 puts switch 68, switch 76, switch 92, and switch 100 in the states shown in FIG. 2. That is, in the generate seed mode switch 68 couples seed generator 54 to equalizer tap storage 64, switch 76 couples input port 80 of equalizer filter 72 to tap adapter 96, switch 92 couples channel estimator 50 to input port 84 of equalizer filter 72, and switch 100 couples 1 (one) to tap adapter 96. Further, in the generate seed mode adaptive equalizer 36 generates the tap seed as discussed above (method 200, FIG. 3). After the generate seed mode (i.e., after the tap seed is loaded into equalizer tap storage 64), tap initialization controller 108 initiates an "update tap" mode.

In the update tap mode, tap initialization controller 108 puts switch 68 in its alternate state from that shown in FIG. 2, thereby uncoupling seed generator 54 from equalizer tap storage 64 and coupling tap adapter 96 to equalizer tap storage 64 through switch 68. During the update tap mode, tap initialization controller 108 maintains switch 76, switch 92, and switch 100 in the states shown in FIG. 2. Further, in the tap update mode adaptive equalizer 36 executes the adaptive algorithm as discussed above (method 300, FIG. 4). After the update tap mode (i.e., when the error becomes less than the limit), tap initialization controller 108 initiates a "track data" mode.

In the track data mode, tap initialization controller 108 maintains switch 68 in its alternate state from that shown in FIG. 2, and tap initialization controller 108 puts switch 76, switch 92, and switch 100 all in alternate states from as they are shown in FIG. 2. That is, switch 68 couples tap adapter 96 to equalizer tap storage 64, switch 76 couples input port 84 of equalizer filter 72 to tap adapter 96, switch 92 couples the received data symbols to input port 84 of equalizer filter 72, and switch 100 couples slicer 104 to tap adapter 96. Further, it should be appreciated that during the track data mode, adaptive equalizer 36 adapts the data in equalizer tap storage 64 (which is coupled to input port 80 of equalizer filter 72) based on the received data symbols and LMS (or any other suitable technique).

Thus, according to the principle of the present invention, an OFDM receiver generates an initial equalizer tap setting based on an adaptive algorithm.

While the present invention has been described with reference to the preferred embodiments, it is apparent that that various changes may be made in the embodiments without departing from the spirit and the scope of the invention, as defined by the appended claims.

What is claimed is:

1. A method for initializing an equalizer in an Orthogonal Frequency Division Multiplexing ("OFDM") receiver, the method comprising the steps of:

generating a channel estimate based on a received OFDM training symbol and a first quantity;

generating a second quantity based on a quantized magnitude squared of the channel estimate;

generating an equalizer tap setting based on a complex conjugate of the channel estimate and the second quantity;

generating an error based on a difference between one and a product of an existing equalizer tap setting and the channel estimate;

generating a subsequent equalizer tap setting based on the error and the existing equalizer tap setting; and repeating the steps of generating the error and generating the subsequent equalizer tap setting until the error falls within predetermined limits.

2. The method of claim 1, wherein the step of generating the subsequent equalizer tap setting includes generating the subsequent equalizer tap setting based on a least-mean-squares ("LMS") algorithm.

3. The method of claim 1, wherein the step of generating the channel estimate includes receiving the training symbol over a wireless local area network.

4. The method of claim 1, wherein the step of generating the channel estimate includes receiving the training symbol into at least one of a portable computer and a desktop computer.

5. The method of claim 1, wherein the step of generating the channel estimate includes:

retrieving an inverse of a reference training symbol from a storage device; and generating the channel estimate based on a product of the received training symbol and the inverse.

6. The method of claim 1, wherein the step of generating the channel estimate includes reversing the sign of the received training symbol.

7. The method of claim 6, wherein the step of generating the channel estimate further includes extracting the training symbol from a HIPERLAN/2 transmission.

8. The method of claim 1, wherein the step of generating the second quantity includes quantizing the magnitude squared of the channel estimate to a power of two.

9. The method of claim 1, wherein the step of generating the second quantity includes representing the second quantity as bits in a register and the step of generating the equalizer tap setting includes right shifting the bits in the register.

10. An apparatus for initializing equalization operations in an Orthogonal Frequency Division Multiplexing ("OFDM") receiver, the apparatus comprising:

a tap initialization controller configured to generate a channel estimate based on a received OFDM training symbol and a first quantity;

generate a second quantity based on a quantized magnitude squared of the channel estimate;

generate an equalizer tap setting based on a complex conjugate of the channel estimate and the second quantity; equalizer tap setting and the channel estimate;

generate a subsequent equalizer tap setting based on the error and the existing equalizer tap setting; and repeatedly generate the error and the subsequent equalizer tap setting until the error falls within predetermined limits.

11. The apparatus of claim 10, further comprising an equalizer coupled to the tap initialization controller to receive the equalizer tap settings therefrom.

12. The apparatus of claim 11, wherein the tap initialization controller is further configured to generate the subsequent equalizer tap setting based on a least-mean-squares ("LMS") algorithm.

13. The apparatus of claim 11, wherein the tap initialization controller is further configured to retrieve an inverse of a reference training symbol from a storage device and generate the channel estimate based on a product of the received training symbol and the inverse.

14. The apparatus of claim 11, wherein the tap initialization controller is further configured to reverse the sign of the received training symbol.

15. The apparatus of claim 14, further comprising:

an OFDM training sequence extractor coupled to the tap initialization controller to provide the training symbol thereto, the training sequence extractor being configured to extract the training symbol from a HIPERLAN/2 transmission.

16. The apparatus of claim 11, wherein the tap initialization controller is further configured to quantize the magnitude squared of the channel estimate to a power of two.

* * * * *